3,102,626
CONVEYOR PACKAGE LIFTER ASSEMBLY
Lewis F. Hanes, Bartlesville, Okla., assignor to Phillips Petroleum Company, a corporation of Delaware
Filed Oct. 16, 1961, Ser. No. 145,282
6 Claims. (Cl. 198—25)

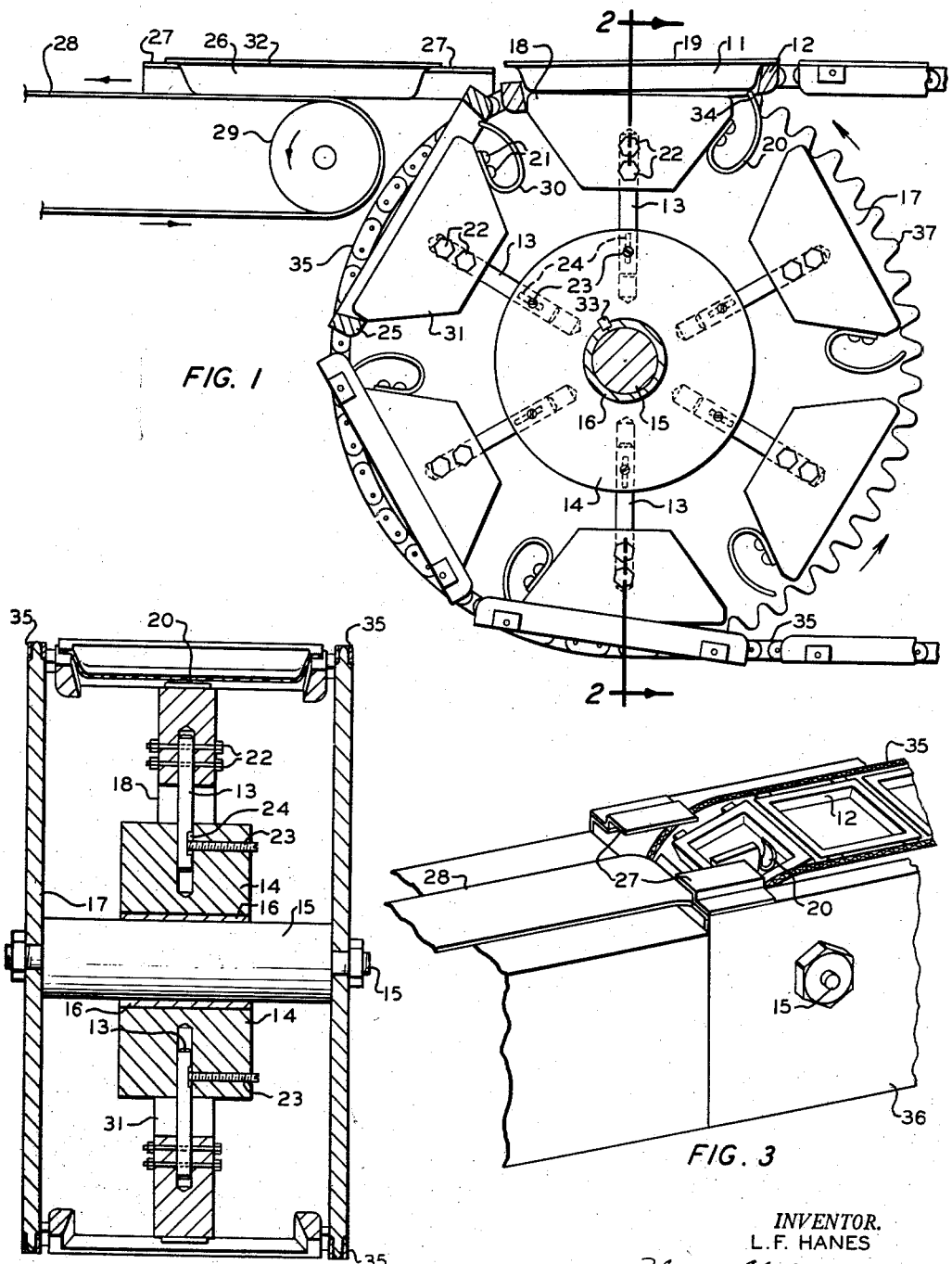

This invention relates to apparatus for lifting packages from nests of an endless nest conveyor. In one aspect it relates to a self-positioning device for lifting packages from nests of an endless nest conveyor. In another aspect it relates to such a lifting device for use with packages greater than and less than 1⅛ inches in depth and made of thermoplastic materials.

Package lifting devices are used for lifting filled and sealed thermoplastic packages from endless nest conveyors for transfer to take-off belt conveyors. These conveyors operate in conjunction with package filling and sealing machines. In a conventional nest conveyor the lifting pads are made to lift packages having a height of about 1⅛″ or more. Furthermore, such conveyors are usually chain and sprocket wheel driven conveyors. The package lifting devices are mounted on a wheel which is keyed or otherwise fixed to rotate with the shaft on which one or more conveyor sprocket wheels are mounted. These sprocket wheels and lifting device wheels are keyed to the shaft in timing with the nests so that successive lifting pads can enter successive nests through their open bottoms to lift the filled and sealed packages. Upon extended use of such machinery, the chains and wheel sprockets may become worn and throw the nests and lifting pads out of time with each other. Depending upon the degree of wear, the lifting pads sometimes contact an end of the nests prior to entry thereinto and enter the nests with such force that packages are thrown therefrom or dislodged into unfavorable positions for transfer to a take-off conveyor belt.

According to this invention I have devised self-adjusting lifting pad apparatus for lifting filled and sealed packages from conveyor nests irrespective of the conveyor chain and sprocket wheel wear. The self-adjusting feature involves mounting the lifting pad support wheel on the sprocket wheel or wheel shaft but rotatably independent therefrom. A separate U-shaped spring is attached to each lifting pad to position the pad in the open bottom nest and the pads are longer in the direction of the radius of their mounting wheel than pads previously used so that they can extend well into the nests for lifting shallow packages. Also, the lifting pad surface is shorter in the direction of the length of package to be lifted so the combined pad surface and spring can be easily inserted into the open nest. Arrangements of this type have been operated successfully over extended periods of time.

An object of this invention is to provide a self-positioning device for lifting packages from nests of an endless nest conveyor. Yet another object of this invention is to provide self-adjusting lifting pad apparatus for use with endless nest conveyors in transferring packages to an endless take-off belt. Other objects and advantages of this invention will be realized upon reading the following description which, taken with the attached drawing, forms a part of this specification.

In the drawing FIGURE 1 is an elevational view, partly in section, of a wheel with lifting pads of the invention mounted thereon, and an adjacent end of a take-off conveyor belt used in conjunction therewith. FIGURE 2 is a view, partly in section, taken on the line 2—2 of FIGURE 1. FIGURE 3 is a perspective view of the discharge end of a nest conveyor fitted with the self-adjusting lifting pads of this invention and the adjacent end of a take-off belt conveyor used in conjunction therewith.

In the drawing reference numeral 11 identifies a tray lifted from an open bottom basket 12 by a lifting pad 18. Pad 18 is attached to one end of a stud 13 by bolts 22. The opposite end of stud 13 is inserted into the periphery of a wheel 14 and is attached thereto by a set screw 23. A portion of the surface of the stud 13 is flattened at 24 to provide a proper seat for set screw 23. This surface 24 is slightly elongated, as illustrated, to provide an adjustment for regulation of the distance which pad 18 travels into the open bottom of nest 12. Another open bottom nest 25 is shown in a position 60° in advance of the position of nest 12. A tray 26 has just been lifted from nest 25 and placed upon take-off belt 28. Take-off belt 28 is positioned by an idler wheel 29. Trays 11 and 26 are provided with side rim flanges 19 and 32, respectively. Upon being lifted from their respective nests, the flanges of the trays are lifted to an elevation above support flanges 27 which are mounted rigidly on side members of the nest conveyor assembly. The nest conveyor side structural members are not shown in FIGURES 1 or 2 but are illustrated in the perspective view of FIGURE 3 and identified by reference numeral 36. In transferring the packages 11 and 26 onto the conveyor belt 28, the packages are lifted, as mentioned, to a level so that side flanges 32 of tray 26 and side flanges 19 of tray 11 are at an elevation above the support flanges 27 so that upon movement from right to left, as illustrated in FIGURE 1, flanges 32 and 19 will rest on top of flanges 27. The following ends of the conveyor nests then push the respective packages further to the left and ultimately the conveyor belt 28 receives the packages and continues conveyance thereof.

The lifting pad support wheel 14 is provided with a bushing 16 keyed thereto by a key 33. In this manner, bushing 16 and wheel 14 rotate around the sprocket wheel shaft 15 as a unit. In other words, the pad support wheel 14 and the bushing 16 rotate freely around shaft 15. In FIGURE 1 is illustrated the pad support wheel 14 and the bushing 16 with shaft 15 in place. On the following end of the lifting pads 31 and 18, as illustrated, are mounted, in general, U-shaped springs 30 and 20, respectively. If the lifting pads are constructed of wood, as for example plywood, the U-shaped springs can be attached thereto by means of wood screws 21. However, if the lifting pads are metal, then the U-shaped springs can be attached thereto by machine screws.

While these springs 20 and 30 are described and claimed herein as U-shaped springs, their shape is not truly that of a U. The free ends of these springs are longer than the supported ends with the ends bent somewhat close together so that as illustrated in FIGURE 1 the free end 34 can have the position illustrated in this figure when in its operable position in lifting tray 11 from the open bottom nest 12. It will be noted that the length of the lifting pads 18 and 31 is considerably shorter than the length of the opening in nests to make room for the free end of the respective springs. By mounting the springs in this manner with the shape as shown on the drawing, upon entry of the lifting surface of, for example, pad 18 into the bottom of open nest 12, the free end 34 of spring 20 adjusts the position of the pad 18 so that the left-hand end thereof touches the inner edge of the left-hand end of nest 12 while the free end 34 of spring 20 touches the inner edge of the right-hand end of nest 12. In this manner, the pad is relatively, rigidly positioned within the nest 12 and does not vibrate and is not jarred in any manner while contacting tray 11. In this manner, tray 11 is carefully lifted from nest 12 and the following (right-hand) end of nest 12 by bearing against the free end 34 of spring 20 rotates the wheel 14 and pads and the flange 19 of tray 11 is positioned on top of the slide flange 27. Then, upon continued rotation of the sprocket wheel 17 and corresponding movement of the nest conveyor, the following end of nest 12 pushes the tray 11 further onto the slide flanges 27 until such time that the leading end of tray 11 contacts the belt 28. When this condition exists the conveyor takes over and moves the tray 11 from the nest conveyor to some point of disposal, not shown. The nest 25 is illustrated in FIGURE 1 as having its tray 26 just removed therefrom by pad 31. Chain 35 meshes with sprockets 37 on sprocket wheel 17.

In the particular assembly illustrated, it is noted that there are positions on wheel 14 for six equally spaced lifting pads, as pads 18 and 31. There will thus be from 3 to 4 pads with their springs (as springs 20 and 21) in contact with the following ends of their respective nests. These several following ends of nests bear against the free end of the respective springs and this bearing easily rotates the lifting pads and their mounting wheel in the same direction of rotation as the sprocket wheels. However, since the pads and pad supporting wheel 14 are not attached rigidly to shaft 15, any wear of the chains of the chain-driven nest conveyor or any wear of the sprockets of the sprocket wheels are compensated for by the flexibility of the U-shaped springs 20, 30. If the position of pad 18 is such that the lifting surface of the pad just barely enters the open bottom of the nest 12, the U-shaped spring 20 will be compressed less than it is compressed as illustrated in FIGURE 1. However, if the pad 18 enters nest 12 further or higher than illustrated in FIGURE 1, then the free end 34 of spring 20 will be compressed further to the left than illustrated in FIGURE 1. In this manner, it is seen clearly that the flexibility of sping 20 makes possible the enty of pad 18 any desied distance into the open bottom of nest 12 to maintain the pad 18 definitely and positively positioned within the opening in the nest 12.

As illustrated in the perspective view of FIGURE 3, the lifting pads can be anywhere from ¼, ⅓ or even ½ of the width of the tray 19 to be lifted from the nests. This width of the pad is also illustrated in FIGURE 2 of the drawing and this width is shown in this figure to be less than the thickness of the wheel 14.

Wheel 14 and pads 18 and 31 can be constructed of any reasonably hard and otherwise material desired. For example, wheel 14 and the pads can be constructed of wood if desired. Pads 18 in one case were constructed of plywood while wheel 14 was constructed of metal. Bushing 16 obviously is constructed of a suitable metal and this bushing, as mentioned hereinbefore, is keyed to the wheel 14 by key or other means 33 so that the bushing will rotate with the wheel. And, also as mentioned hereinbefore, bushing 16 is free to rotate in a free wheeling manner around shaft 15. In this manner, irrespective of the amount of wear of the sprockets or the chain in the nest sprocket wheel conveyor assembly, the lifting pads with their flexible springs 20, etc. are positively and definitely positioned within the openings of the nests for proper lifting of the packages and their transfer to the take-off belt 28.

It is preferable, however, that the pad supporting wheel 14 be made of a metal so that the set screws 23 or other means can be tightly held against the plane surface 24 of the studs 13 to hold the lifting pads in proper alignment with their direction of rotation.

While certain embodiments of the invention have been described for illustrative purposes, the invention obviously is not limited thereto.

I claim:

1. A self-positioning device for lifting a package from a nest of an endless nest conveyor, said nest having an open bottom, comprising, in operable combination, a package lifting means, said lifting means being shorter in length than the length of the open bottom, said lifting means also being so positioned in its operable position that its longitudinal axis is parallel to the longitudinal axis of said opening, a spring supported by said lifting means and having a free portion, said free portion of said spring being so positioned with respect to said lifting means that said lifting means and spring have an operative length at least as great in the direction of the longitudinal axis of said lifting means as the length of said bottom opening in the direction of said longitudinal axis.

2. A self-positioning device for lifting a package from a nest of an endless nest conveyor, said nest having an open bottom, comprising, in operable combination, a package lifting means having an elongated, flat surface adapted for contacting a package to be lifted, the longitudinal axis of said surface being parallel to one axis of the opening of said open bottom, the length of said surface being shorter than the length of said opening in the direction of said one axis, said lifting means being adapted to enter said opening in such a manner that said flat surface is positioned within said nest and parallel to the axes of said opening, a spring supported by said package lifting means, a portion of said spring being so positioned with respect to said lifting means that said portion of spring is adapted to enter said opening upon entry of said lifting means into said opening, the effective over-all length of said lifting means and spring in the direction of said one axis is at least as long as the length of said opening in the direction of said one axis, whereby said lifting means is adapted to position itself upon entry of said flat surface of said lifting means and said portion of spring into said open bottom.

3. A self-positioning device for lifting a package from a nest of an endless nest conveyor, said nest having an open bottom and said conveyor being a chain-driven conveyor and having at least one sprocket wheel at the driven end of said conveyor, said wheel being rotatably supported by an axle in such a manner that the chain of said conveyor meshes with the sprockets of said wheel, comprising, in operable combination, a package lifting pad, said pad being adjustably supported by a support means, said support means being supported rotatably by said axle and in a free-wheeling manner thereby, said support means, said sprocket wheel and said axle having a common axis, said lifting pad having a flat surface parallel to said common axis at such a distance therefrom that said flat surface of said pad in its operable package lifting position is positioned within said open bottom of said nest thereby lifting said package from said nest, a spring supported by said pad and having a free portion, said free portion of said spring being so positioned with respect to said pad that said flat surface and said free portion of said spring enter said opening, and one end of said pad contacts one end of said nest and said spring contacts the other end of said nest thereby definitely positioning said lifting pad within said opening in a package lifting position.

4. A self-positioning device for lifting a package from an open bottom nest of an endless nest conveyor, said conveyor being a sprocket wheel and a chain-driven conveyor wherein upon extended operation the chain and the sprockets and said wheel become worn, said sprocket wheel being rotatably supported by an axle, comprising, in operable combination, a wheel supported by said axle, said wheel being rotatably independent of said axle, a package lifting pad mounted from the periphery of the independently rotatable wheel, said lifting pad having a package contacting and lifting surface parallel to the axis of rotation of said rotatable wheel, said lifting surface of said pad having its longest dimension shorter than the longest dimension of the opening in said open bottom basket, these longest dimensions being in a direction parallel to the line of travel of said conveyor, a spring supported by said pad, said spring having a free, flexible portion positioned at one end of said longest dimension of said pad, said free, flexible portion of said spring also being so positioned with respect to said package lifting and contacting surface that upon entry of the lifting surface of said pad into said opening the flexible portion of said spring also enters said opening thereby maintaining said lifting pad surface in alignment to enter said opening irrespective of misalignment caused by wear of said chain and sprockets of said sprocket wheel.

5. In a device for lifting a package from an open bottom nest of an endless nest conveyor wherein said conveyor is a sprocket wheel and chain-driven conveyor, a chain of said conveyor meshing with said sprocket wheel in conventional reversal of direction of travel of said conveyor, and said sprocket wheel being mounted on a shaft, and wherein upon extended operation of the device said chain and sprocket wheel become worn and each package lifter fails to enter its nest operably for lifting a package, the improvement of a self-adjusting package lifter assembly for such a device comprising, in operable combination, a wheel mounted on said shaft and freely rotatable thereon, a plurality of package lifting pads mounted at spaced intervals around the periphery of said wheel, said lifting pads being spaced in such a manner as to mesh with open bottom nests of said conveyor, a separate spring mounted at the following end of each pad, each spring having a flexible portion adapted to contact a nest at the following end of the nest opening and to bias the front end of its pad against the nest at the leading end of the nest opening as the nest lifting end of each pad enters its respective nest opening.

6. In a device for lifting a package from an open bottom nest of an endless nest conveyor wherein said conveyor is a sprocket wheel and chain-driven conveyor, a chain of said conveyor meshing with said sprocket wheel in conventional reversal of direction of travel of said conveyor, and said sprocket wheel being mounted on a shaft, and wherein upon extended operation of the device said chain and sprocket wheel become worn and each package lifter fails to enter its nest operably for lifting a package, the improvement of a self-adjusting lifter assembly for such a device comprising, in operable combination, a wheel mounted on said shaft and freely rotatable thereon, a plurality of package lifting pads mounted at spaced intervals around the periphery of said wheel, said lifting pads being spaced in such a manner as to mesh with successive open bottom nests of said conveyor, a separate U-shaped spring attached by one leg thereof to the following end of each lifting pad, the other leg of said spring being flexible with respect to said one leg, the free end of said other leg of said spring being so positioned with respect to said pad that when said pad and free end of the spring are properly positioned with respect to the opening of an open bottom nest said pad and free end of said spring can enter said opening until the leading end of said pad and the free end of said spring contact said nest at opposite ends of said opening, and said pad and spring when so positioned in its nest operably position the next successive pad and its spring with respect to its open bottom nest irrespective of the wear from extended use of said chain and sprocket wheel.

References Cited in the file of this patent
UNITED STATES PATENTS
2,896,387  Brock _____ July 28, 1959